Patented Mar. 25, 1924.

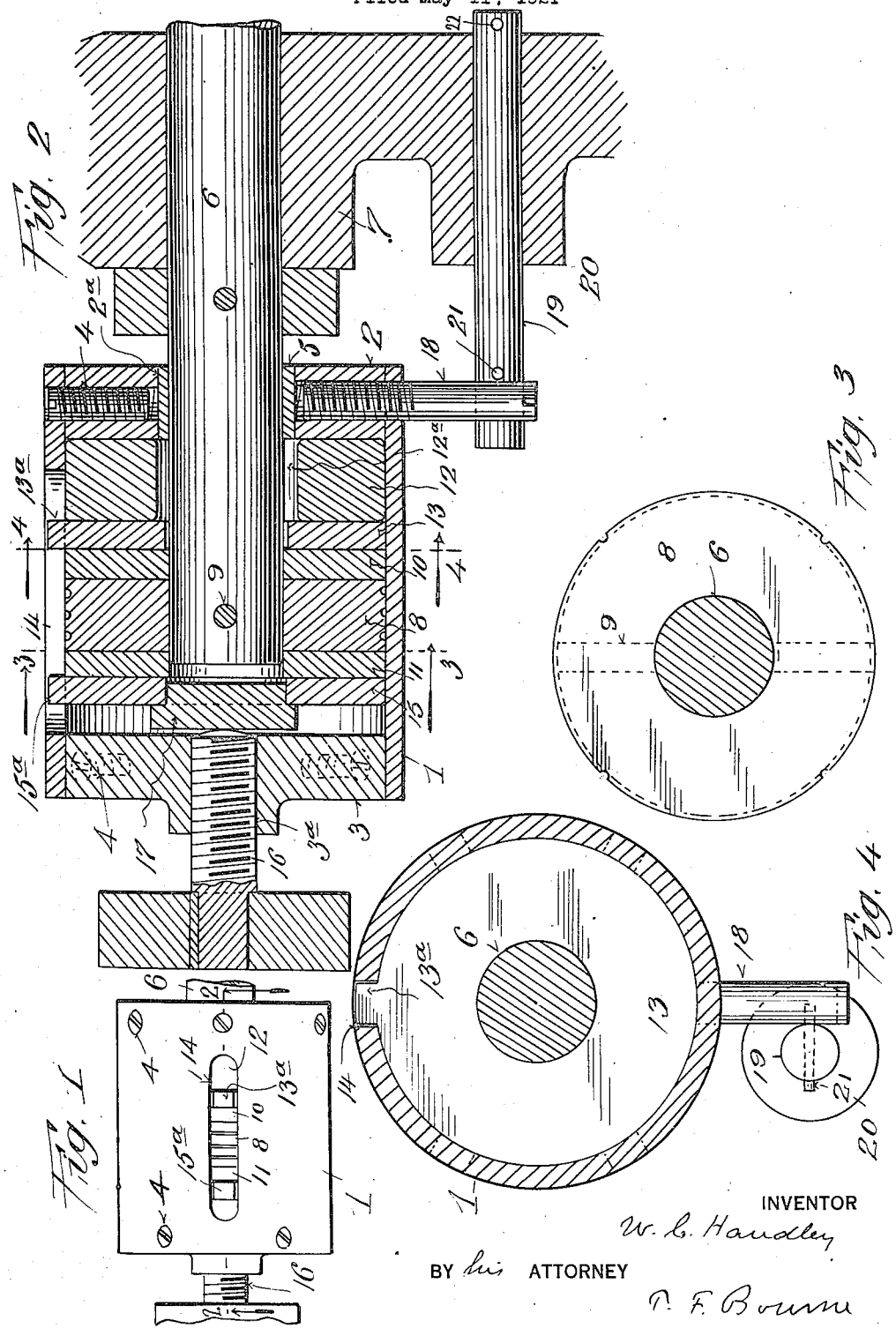

1,487,853

UNITED STATES PATENT OFFICE.

WILLIAM C. HANDLEY, OF MOUNT VERNON, NEW YORK.

BRAKE MECHANISM.

Application filed May 11, 1921. Serial No. 468,578,

*To all whom it may concern:*

Be it known that I, WILLIAM C. HANDLEY, a citizen of the United States, and resident of Mount Vernon, in the county of Westchester and State of New York, have invented certain new and useful Improvements in Brake Mechanism, of which the following is a specification.

The object of this invention is to provide brake mechanism of simple character, capable of desired adjustment, adapted to afford resistance to the rotation of a shaft or other rotary member.

The brake mechanism herein referred to is adapted to be supported practically entirely by the shaft or other rotary member referred to, in a concentric manner, only requiring to have rotary motion of certain parts resisted.

The invention comprises such details of improvement that will be more fully hereinafter referred to and then pointed out in the claims.

Reference is to be had to the accompanying drawings forming part hereof, wherein—

Fig. 1 is a plan view of the improved brake mechanism; Fig. 2 is a section on line, 2, 2 in Fig. 1, on an enlarged scale; Figs. 3 and 4 are cross sections on line 3, 3 and 4, 4 respectively in Fig. 2.

The numeral 1, in the accompanying drawings, indicates an outer shell or casing of the brake mechanism, which may be of steel tubing, shown having heads 2, 3 at opposite ends, which parts may be secured together by screws 4. Head 2 has a bore $2^a$, preferably provided with a bushing or bearing 5, for a shaft 6 on which the brake is mounted. Shaft 6 may be journaled in any suitable bearing, such as 7. Within shell 1 shaft 6 is provided with a disk 8, which may be secured to the shaft by pin 9. Friction disks 10, 11 are mounted freely on shaft 6, on opposite sides of disk 8, to rotate freely within shell 1. An elastic or compressible disk-like member 12, preferably of rubber, is mounted freely within shell 1, having a bore $12^a$ receiving shaft 6 with sufficient freedom to permit proper compression of said member. The member 12 opposes head 2 on one side and on the other side said member engages a disk 13, preferably of metal, mounted freely on shaft 6 and located against friction disk 10. The disk 13 is provided with a projection $13^a$ slidable in a longitudinal slot 14 in shell 1. Disk 11 bears against a disk 15 free from shaft 6, preferably of metal, and provided with a projection $15^a$ slidable in slot 14. A screw 16, meshing in a threaded hole $3^a$ in head 3 is adapted to cooperate with disk 15. By preference a wear piece 17 is attached centrally to disk 15 to receive the pressure from screw 16. Shell 1 is shown provided with a projection 18 to engage a stop 19 carried by support 20. The stop 19 is movable, preferably being slidable in support 20, to be placed at will in and out of the path of projection 18. Pins 21 and 22 at opposite ends of stop 19 retain it on support 20.

The operative parts of the brake, except projection 18, are supported axially with respect to shaft 6, and when stop 19 does not oppose projection 18 the brake parts will revolve with the shaft without affecting or braking its rotation. When it is desired that the brake mechanism shall resist or retard the rotation of shaft 6 the stop 19 is placed in the path of projection 18 to prevent the rotation of shell 1, and screw 16 is adjusted against wear piece 17 to produce the desired friction between the inner disks and members with respect to heads 2 and 3. Since disk 8 rotates with shaft 6 the other disks and members will be jammed together with respect to disk 8, since screw 16 will cause head 2 and disks 10, 12, 13 to be drawn toward disk 8, and said screw will push disks 11 and 15 toward disk 8. The desired friction between the parts may be produced according to the adjustment of screw 16. Since the shell, its heads, and disks 13 and 15 do not rotate with shaft 6 when projection 18 engages stop 19 the rotation of said shaft will be controlled by the frictional engagement of disk 8 with friction disks 10 and 11, the compressible disk or member 12 accommodating undue resistance of the parts. A very fine frictional braking effect may be produced by the means described.

This invention will be found of advantage in controlling the rotation of shaft 6 in various relations, particularly where webs of paper or fabric are to be drawn from a roll or bolt mounted upon the shaft, whereby desired resistance to unwinding of the roll or bolt may be produced by a simple adjustment of screw 16, the brake also resisting overrunning of shaft 6.

Having now described the invention, I claim:

1. A brake mechanism comprising a shaft, a shell rotative thereon, means to at will resist rotation of the shell, a disk secured upon the shaft, other disks upon the shaft within the shell, and means supported by the shell independent of the shaft to control the pressure of the disks against one another.

2. A brake mechanism comprising a shaft, a shell rotative thereon, means to at will resist rotation of the shell, a disk secured upon the shaft, friction disks against the first named disk, and means supported by the shell independent of the shaft to force said disks together.

3. A brake mechanism comprising a shaft, a shell rotative thereon, means to at will resist rotation of the shell, a disk secured upon the shaft, friction disks against the first named disk, a compressible disk around the shaft, and means supported by the shell independent of the shaft to compress said disks together.

4. A brake mechanism comprising a shaft, a shell rotative thereon, means to at will resist rotation of the shell, a disk secured upon the shaft, friction disks against the first named disk, disks within the shell on opposite sides of the friction disks having projections slidable in a slot in the shell, and means to compress the disks together.

5. A brake mechanism comprising a shell having spaced heads, a shaft rotatively supporting said heads, a disk secured upon the shaft, disks between said heads and the first named disk, a screw carried by one of said heads to cause said disks to be compressed together, and means to resist rotation of the shell.

6. A brake mechanism comprising a shell having spaced heads, a shaft rotatively supporting said heads, a disk secured upon the shaft, disks between said heads and the first named disk comprising a compressible disk and disks positively rotative with the shell, a screw carried by one head operative with said disks to compress them together, and means to resist rotation of the shell.

7. A brake mechanism comprising a shell having spaced heads, a shaft rotatively supporting said heads, a disk secured upon the shaft, disks between said heads and the first named disk comprising disks having projections slidable in a slot in the shell, a screw carried by one of the heads in axial alignment with the shaft, and means to at will control rotation of the shell.

Signed at New York city, in the county of New York and State of New York, this 10th day of May, A. D. 1921.

WILLIAM C. HANDLEY.